FIG. 1
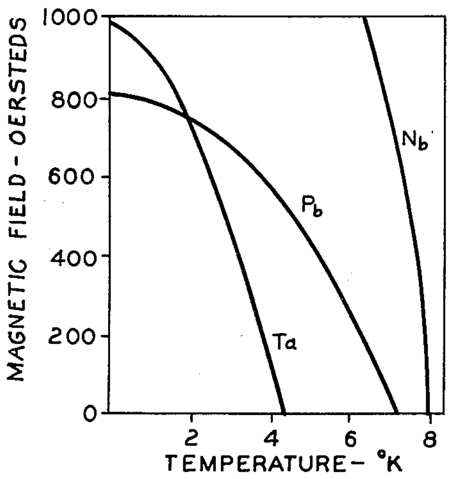
FIG. 2
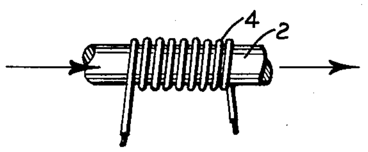
FIG. 4
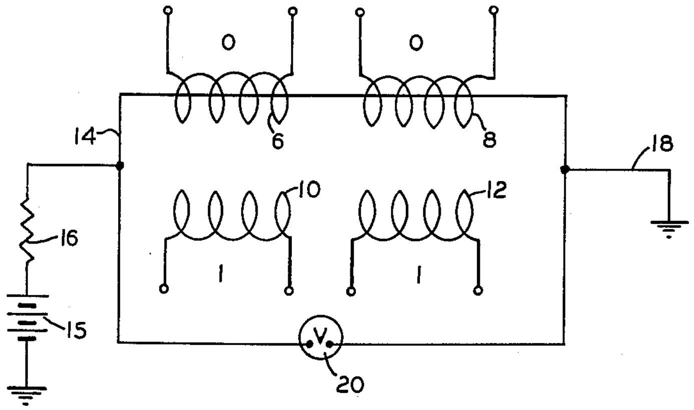
FIG. 3
| | 0 | 1 |
|---|---|---|
| 0 | 0 | 0 |
| 1 | 0 | 1 |
INVENTORS.
ALBERT E. SLADE
DUDLEY A. BUCK
BY: Blair & Spencer
ATTORNEY.

| MULTIPLICANDS \ MULTIPLIERS | 00 | 01 | 10 | 11 |
|---|---|---|---|---|
| 00 | 00 | 00 | 00 | 00 |
| 01 | 00 | 01 | 10 | 11 |
| 10 | 00 | 10 | 100 | 110 |
| 11 | 00 | 11 | 110 | 1001 |

INVENTORS.
ALBERT E. SLADE
DUDLEY A. BUCK

BY: Blair & Spencer
ATTORNEY.

Feb. 6, 1962 A. E. SLADE ET AL 3,019,978

CRYOTRON TRANSLATORS

Filed March 7, 1957 3 Sheets-Sheet 3

INVENTORS.
ALBERT E. SLADE
DUDLEY A. BUCK
BY: Blair & Spencer
ATTORNEY.

United States Patent Office 3,019,978

Patented Feb. 6, 1962

3,019,978

CRYOTRON TRANSLATORS

Albert Ernest Slade, Cochituate, and Dudley Allen Buck, North Wilmington, Mass., assignors to Arthur D. Little, Inc., Cambridge, Mass.

Filed Mar. 7, 1957, Ser. No. 644,581

11 Claims. (Cl. 235—164)

This invention relates to multiple input cryotron translators which may be used as arithmetic elements in digital computers. More particularly, it relates to high speed arithmetic elements which perform the various arithmetic functions of a digital computer in a single step.

Figures 5, 6:
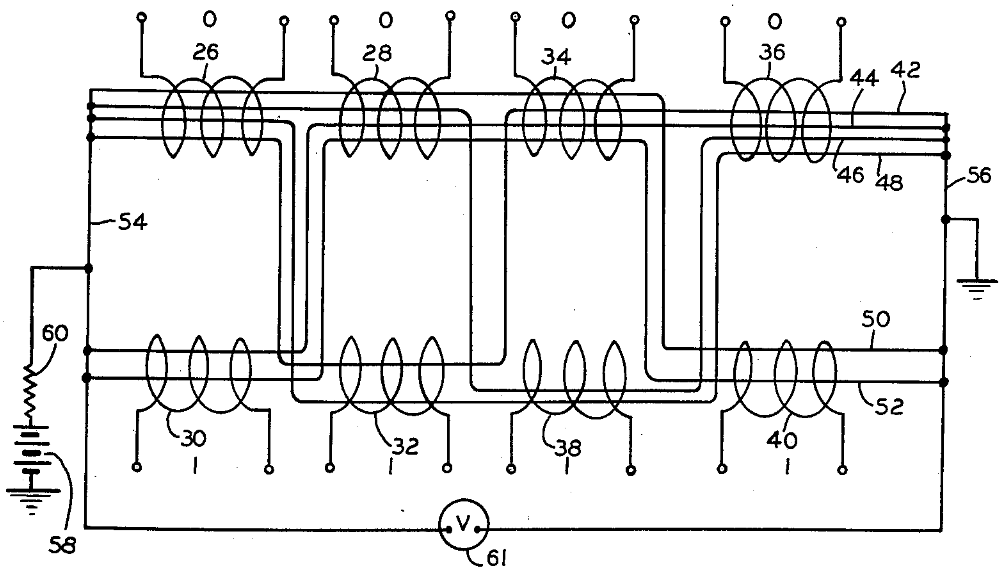
Figure 7:
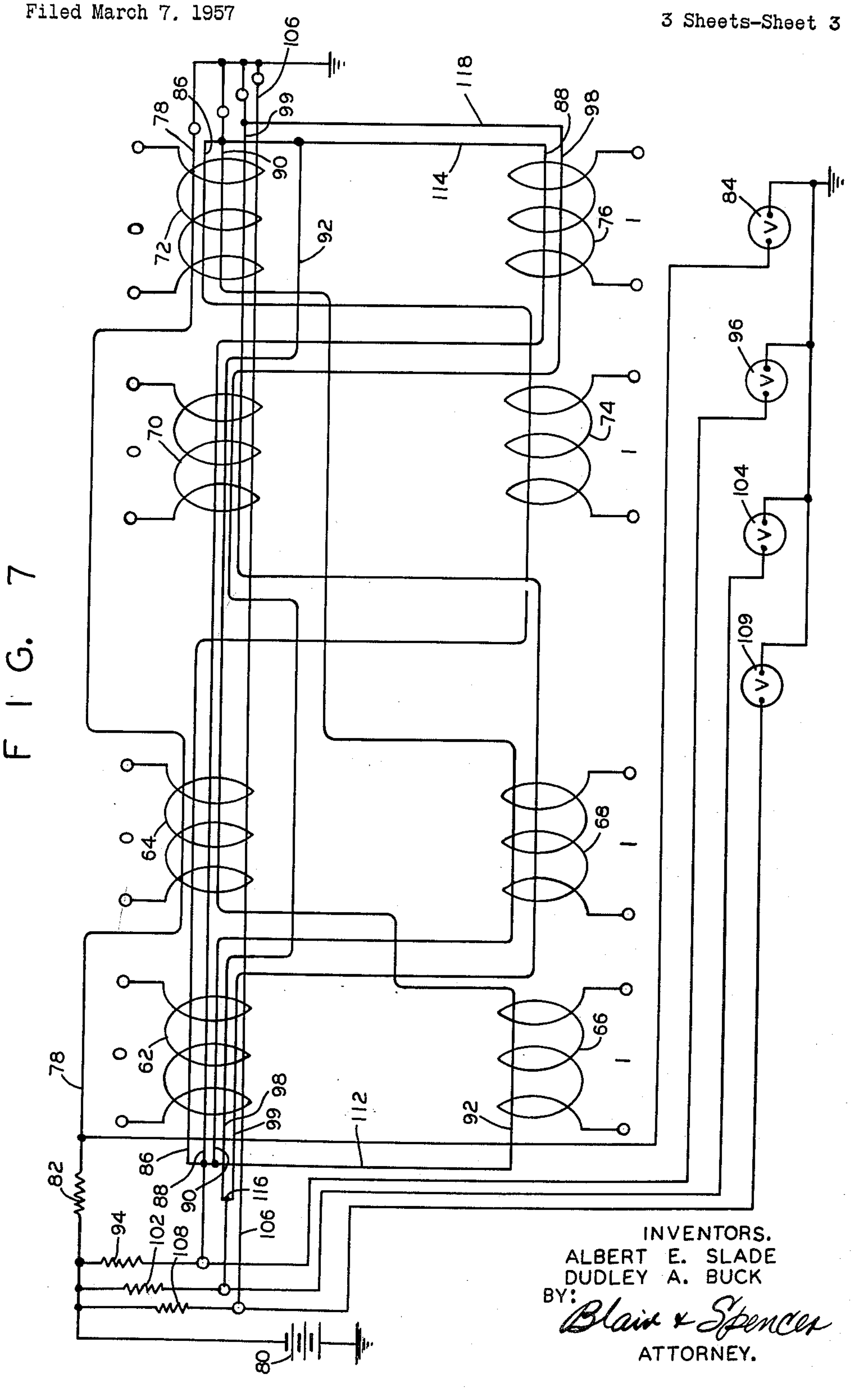

The construction and operation of our cryotron translator may be best understood from the following description taken with the accompanying drawings in which:

FIGURE 1 is a family of curves for different materials showing how the temperature at which these materials become superconductive changes as a function of applied magnetic field, FIGURE 2 is a diagrammatic representation of an individual cryotron unit, FIGURE 3 is a multiplication table for one digit binary numbers, FIGURE 4 is a circuit diagram of a multiplier made according to our invention which performs the multiplication of FIGURE 3, FIGURE 5 is a multiplication table for two digit binary numbers, FIGURE 6 is a circuit diagram of the second digit memory of a multiplier made according to our invention, and FIGURE 7 is a circuit diagram of a complete multiplier for two digit binary numbers made according to our invention.

The cryotron, which is a switching element useful in digital computers, depends for its operation on the changes in properties of certain electrical conductors when subjected to temperatures approaching absolute zero. In the absence of a magnetic field, these materials change suddenly from a resistive state to a superconductive state in which their resistance is identically zero as the temperature approaches absolute zero. The temperature at which this change occurs is known as the transition temperature. When a magnetic field is applied to the conductor, the transition temperature is lowered, the relationship between applied magnetic field and transition temperature for a number of these materials being shown in FIGURE 1. As shown therein, in the absence of a magnetic field tantalum loses all electrical resistance when reduced to a temperature of 4.4° K. or below, lead does so at 7.2° K., and niobium at 8° K. In all, there are 21 elements in addition to many alloys and compounds which undergo transition to the superconductive state at a temperature ranging between 0° and 17° K. The presence of a magnetic field causes the normal transition temperature to move to a lower value, or, if a constant temperature is maintained, a magnetic field of sufficient intensity will cause the superconductive material to revert to its normal resistive state. From FIGURE 1 it is apparent that a magnetic field of between 50 and 100 oersteds will cause a tantalum wire held at 4.2° K. (the temperature of liquid helium at atmospheric temperature) to change from a superconductive to a resistive state.

The cryotron is a circuit element which makes use of the shift between the superconductive and normal resistive states of these materials, when held at constant temperatures. For example, FIGURE 2 illustrates an individual cryotron unit having a central or gate conductor 2 about which is wound a control coil 4, both the gate conductor and the coil being of materials which are normally superconductive at depressed temperatures. The entire unit is immersed in liquid helium to render the gate wire 2 and the control wire 4 superconductive. If a current of sufficient magnitude is applied to the control coil, the magnetic field produced thereby will cause the gate conductor to transfer from a superconductive to a resistive state. Thus the control coil and gate wire form an electrically operated switch which can be changed from a superconductive to a resistive state by the application of current to the control coil.

Tantalum is the preferable material for gate conductors, since its transition temperature in the 50 to 100 oersted region is 4.2° K., the boiling point of helium at a pressure of one atmosphere. This temperature is attainable without the use of complicated pressure or vacuum equipment for raising or lowering the temperature of liquid helium. Niobium, which has a relatively high quenching field (the field strength required to render a superconductive material resistive), is usually used as the material for the control coil since it is desirable, and in many cases necessary, that the control conductor remain superconductive throughout the operation of the cryotron, and the inner surface of this coil is subject to substantially the same magnetic field as that imposed on the gate conductor. Moreover, in most applications it is desirable to have the control conductor in the form of a coil such as coil 4 in FIGURE 2 in order to reduce the current necessary to produce a quenching field.

Our invention relates to multiple input translators utilizing cryotron principles. A translator in the computer sense is any device which converts a digital number or numbers from one code to another. Thus in a binary digital computer a number in one code may be read in to a translator and a corresponding number in an output code read out from it. An important use of translators is in the performance of the arithmetic functions of addition, subtraction, multiplication, and division. The input to the translators two (or more) numbers in binary form upon which an arithmetic operation is to be performed. The output of the translator then provides a single number which is the sum, product, quotient, or difference of the two numbers, hereinafter referred to as the answer.

Prior to our invention arithmetic elements in high speed digital computers have generally comprised conventional flip-flop adders using vacuum tubes or transistors. These devices perform all arithmetic functions by variations of the adding process and may require many operations to provide an answer. For example, high speed computers sometimes require more than fifty steps to multiply two 16-digit (binary) numbers. The arithmetic element is the heart of the modern digital computer and, therefore, even though the time required for each individual step is relatively small, the large number of steps required prolongs the time required for computation.

As pointed out above, the individual cryotron unit of FIGURE 2 has the basic attributes of an efficient basic computer element; because of its extremely small size, e.g. 1 inch long by 0.020 inch diameter, relatively small size digital computers may be made utilizing these elements. All the elements of such a computer including the arithmetic element should operate on the cryotron principle so that they may efficiently work together without complex coupling equipment and thus retain the advantages of small size and simplicity of construction provided by the basic units.

Accordingly, it is a principal object of our invention to provide an improved multiple input translator capable of high speed operation. It is a further object of our invention to provide improved arithmetic elements capable of high speed multiplication, addition, division, and subin the table of FIGURE 5 having a one in the first place (right-hand digit) are those whose multipliers and multiplicands end in a One.

In FIGURE 6 a memory is illustrated which may be used for the second place in the answer of a two-digit multiplier. This second place memory has a multiplier section comprising Zero control coils 26 and 28 and One coils 30 and 32. The multiplicand section has Zero coils 34 and 36 and One coils 38 and 40. The memory has gate conductors corresponding to those anwsers in the table of FIGURE 5 having Ones in the second place (the second digit from the right). Thus, the product of 10 and 01 is represented by the 1001 gate conductor 48 threaded through Zero coil 26, One coil 32, One coil 38, and Zero coil 36. Similarly, gate conductors 44, 46, 48, 50, and 52 represent the remaining multiplier-multiplicand combinations yielding ones in the second place of the answer. The ends of the gate wires are interconnected by superconductive wires 54 and 56 which also connect them across a battery 58 and a limiting resistor 60 by way of a ground return. Means for determining the presence of a superconductive path through the memory is illustratively indicated by a voltmeter 61.

The total number of gate wires in the memory of FIGURE 6 is six, one for each of the answers in the table of FIGURE 5 having a One in the second place. The six squares in which these answers are located are shaded in FIGURE 5. The generalized formula for the maximum number of wires which could be required in a memory for a given place in the answer is $$\frac{(2^n)\ (2^n-1)}{2}$$

where $n$ is the number of the place counting from the right.

The memory of FIGURE 6 has the phyical appearance of a rope in which coils are wound about various groups of strands. The gate conductors may be formed from one to three mil tantalum wire, the lower size limit being determined by the problems involved in handling, connecting, welding, etc. fine wire. The wire should be as small as possible to minimize the necessary cross section of the control coils which are wound about the gate conductors. The inductance of the coils and the operating time of the memory may thereby be maintained at a minimum if the coils are superconductive. Tantalum is a preferable material for the gate conductors because of the relatively low magnetic field intensity required to render it resistive at the preferred temperature of operation of the memory.

The control coils may be formed from three mil closely wound niobium wire which will not be quenched by the current required to operate the memory. Where the input signals of these coils are supplied from other cryotron elements, the coils should be capable of developing a quenching field, say 100 oersteds, over their entire cross sectional area without causing self-quenching of the cryotron gate conductors to which they are connected. Illustratively, for the memory illustrated in FIGURE 6, control coils one inch long having approximately 250 turns per inch are sufficient for inputs from cryotron flip-flops without causing self-quenching of the tantalum gate conductors in the flip-flops. In applications not requiring inputs from other cryotron devices, the input coils need not be superconductive and may have any number of turns consonant with the current capabilities of the input signal sources. Insulation on the gate conductors and the control coils should be as thin as possible. Illustratively, it may be a one-half mil coating of sintered polytetrafluoroethylene. Preferably, the entire unit is immersed in liquid helium at atmospheric pressure to maintain it at the desired temperature of operation.

The operation of the second digit memory of FIGURE 6 is the same as that of the first digit memory of FIGURE 4. Thus, if it is desired to multiply 01 by 01, Zero coil 26, One coil 32, Zero coil 34, and One coil 40 will be energized to render resistive the gate conductors passing therethrough. Since there is no 0101 gate conductor, all the conductors in the memory must pass through one of the energized coils. The path through the memory is therefore resistive, and the voltage across it, as shown by the voltmeter 61, will indicate a zero for the second place of the answer. Presumably the memory of FIGURE 4 is simultaneously energized, and its output will register a one, providing as an answer the product 01. If on the other hand 10 is multiplied by 01 and One coil 30, Zero coil 28, Zero coil 34, and One coil 40 are energized, the 1001 gate conductor 48 will remain superconductive. Since there is a zero resistance through the memory, the voltage across it will be zero to indicate a one in the second place. The simultaneous answer provided by the memories of FIGURES 4 and 6 will then be 10.

It will be noted that when 01 is multiplied by 10 or 11, the second place in the answer will have a 1. Thus, whenever the first three control stations of FIGURE 6 are energized in the order 011 (Zero coil 26, One coil 32, and Zero coil 34), the path through the memory will be superconductive regardless of which coil in the last station is energized (Zero coil 36 or One coil 40). Therefore, the 0110 gate conductor 52 and the 0111 gate conductor 44 might be combined into a single conductor (not shown in FIGURE 4) passing through One coil 30, Zero coil 28, and Zero coil 34 and then connecting directly to wire 56 without passing through either Zero coil 36 or One coil 40 of the final station. This wire may be designated 011–, and it will not be quenched during energization of coils 26, 32, and 38 regardless of whether either coil 36 or coil 40 is also energized. Thus, there will be a superconductive path through the memory to indicate a 1 in the second digit when the multiplier is 01 and the multiplicand is either 10 or 11.

Likewise, when the multiplier is 10 and the multiplicand is 01, gate conductor 48 remains superconductive, and when 10 is multiplied by 11, gate conductor 42 remains superconductive. Thus, when the first two stations on the left (FIGURE 6) are energized in a 01 order and the last station is energized with a 1, there will be a superconductive path through the memory regardless of whether Zero coil 34 or One coil 38 is energized. Accordingly, wires 42 and 48 may be combined into a single wire which will be called the 10–1 wire passing through Zero coil 26, One coil 32, neither Zero coil 34 nor One coil 38, and thence through Zero coil 36. The number of gate conductors in the second digit memory may thus be reduced from six to four.

In FIGURE 7 we have illustrated a complete two-digit binary multiplier. The multiplier has four memories corresponding to the places in the answer. These memories make use of a single set of control coils, although separate control coils might be used for each memory with the corresponding coils in the various memories connected in series to provide simultaneous read-in for all the memories. Thus the multiplier section has Zero control coils 62 and 64 and One coils 66 and 68, while the multiplicand section has Zero coils 70 and 72 and One coils 74 and 76.

The first place memory has a –1–1 gate conductor 78 passing through multiplier Zero coil 64 and multiplicand Zero coil 72. This memory is connected to a power supply illustratively indicated by the battery 80 through a current limiting resistor 82; mechanism for determining the conductive state of the memory to determine the first digit of the answer is illustratively represented by a voltmeter 84 connected across gate conductor 78.

The second memory in the multiplier of FIGURE 7 has four gate conductors 86, 88, 90, and 92 representing the multiplier-multiplicand combinations providing a 1 in the second place of the answer. This second place memory is similar to the memory shown in FIGURE 6, except that certain of the gate conductors have been combined in the manner described to reduce the overall number from six to four. This memory is connected across the series combination of the battery 80 and a series limiting resistor 94, and its conductive state may be illustratively indicated by a voltmeter 96 connected across it.

As seen in FIGURE 5, there are three multiplier-multiplicand combinations providing a 1 in the third place of the answer, to wit: 10×10, 11×10, and 10×11, and therefore three gate conductors might be used in the third place memory. However, it will be noted that when the multiplicand is 10 and the first digit of the multiplier is 1, the third digit of the answer will be a 1 regardless of whether the second digit of the multiplier is a 0 or a 1. Therefore, the 10×10 and 11×10 wires may be combined into a 1–10 wire as indicated at 98 in FIGURE 7. Gate conductor 98 thus passes through Zero coil 62, neither Zero coil 64 nor one coil 68, and thence through Zero coil 70 and One coil 76. The third place memory also contains a 10×11 conductor 99 threaded through Zero coil 62, One coil 68, Zero coil 70, and Zero coil 72. It is connected in series with the limiting resistor 102 across the battery 80. The read-out of the third digit in the memory is illustratively provided by a voltmeter 104 connected across the third place memory.

The multiplication table of FIGURE 5 has but one four-digit answer, and in the multiplier shown in FIGURE 7 this is represented by a four digit memory having a single 11×11 gate conductor 106 passing through Zero coils 62, 64, 70, and 72. Gate conductor 106 is connected with a limiting resistor 108 across battery 80, and a voltmeter 109 is connected thereto to determine its conductive state. The ends of the gate conductors in the second and third digit memories are shown tied together by superconductive wires 112, 114, 116, and 118. However, in actual practice I prefer to form these connections by single welds tying together at each end all the gate conductors in each memeory.

The multiplier shown in FIGURE 7 operates in the same manner previously described. Thus, suppose it is desired to multiply 10×11. One coil 66, Zero coil 64, and One coils 74 and 76 are energized to render resistive the gate conductors passing therethrough. Gate conductor 78 in the first place memory passes through Zero coil 64 and is rendered resistive. First place meter 84 therefore shows a voltage reading indicating a zero in the first digit. In the second place memory, gate conductor 90, passing through none of the energized control coils, remains superconductive, and the second place meter 96 indicates a 1. Similarly, in the third digit memory gate conductor 99 passing through none of the energized coils remains superconductive, and the meter 104 also indicates a 1. Gate conductor 106 of the fourth memory passes through energized Zero coil 64 and, therefore, becomes resistive, and the meter 109 indicates a zero in the fourth place. The answer 0110 is thus read out of the multiplier.

While we have illustratively shown voltmeters for determining the conductive states of the memories of our translators, it will be apparent that suitable means other than a voltmeter might be employed. Also, where a memory has a large number of gate conductors, it may be desirable to amplify the voltage across it. A multiplier made according to our invention and capable of multiplying two ten-digit (binary) numbers would require upwards of a million gate conductors, occupying a space of only about 3 inches by 3 inches by 3 feet. By combining gate wires in the manner described above, the number thereof could be considerably decreased and the space requirement reduced accordingly.

The use of our translators in performing other arithmetic functions is now apparent. Thus a divider would have a series of memories corresponding to the various places in the quotient. Such a unit would have a section for read-in of the divisor and another for the read-in of the dividend, together with gate conductors corresponding to the quotients having a 1 in the answer places with which the memories were associated. Adders and subtractors may similarly be constructed. Our translators may, of course, be used in other translating functions involving multiple read-in where simultaneous read-out is desired. It will also be seen that our translator is not limited to the binary system but may be used with any other digital system. In the generalized case, each control station will have as many control coils or groups thereof as there are digits in the base of the system. Thus a translator for use with the trinary number system would have three control groups at each station.

Accordingly, we have described a multiple input translator having simultaneous read-in of the input digits and simultaneous read-out of the answer digits. Our translator comprises a combination of prewired cryotron memories utilizing the super-conductive properties of certain materials at depressed temperatures. Each memory corresponds to one place in the answer, and the particular digit for that place is determined by the presence or absenc of a superconductive path through the memory during read-in of various input digit combinations. The translator has particular utility in arithmetic elements for performing the various arithmetic operations, and as such its use is characterized by single-step operation making for high speed of computation. It is of simple construction and of relatively small size, making for relatively low-cost manufacture and small space.

It will thus be seen that the objects set forth above, among those made apparent from the preceding description, are efficiently attained and, since certain changes may be made in the above constructions without departing from the scope of the invention, it is intended that all matter contained in the above description or in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A data converter for converting a series of input characters into a logically ordered output sequence of characters, said data converter comprising, in combination, a plurality of memory units, each of said memory units providing upon interrogation a "yes-no" answer concerning the storage of a series of input characters therein, each memory unit corresponding to a predetermined place in said output sequence and to a predetermined character in that place, the stored contents of each of said memory units consisting of every series of input characters which when converted provides the output character to which the memory corresponds in the place to which it corresponds.

2. The combination defined in claim 1 including means for interrogating all of said memory units simultaneously.

3. The combination defined in claim 1 in which said memory units are adapted to store binary numbers, there being a single memory unit for each position in said answer.

4. The combination defined in claim 1 in which each of said memory units is a cryotron memory comprising a plurality of superconductive gate paths connected in parallel to form a composite conductor, a source connected to pass an electric current through said composite conductor, a plurality of control current paths, each of said control paths being in relatively close magnetic proximity to a plurality of portions of gate paths, whereby current through a control path may render resistive the gate path portions in close proximity thereto to the exclusion of the remaining gate path portions, and output means responsive to the presence or absence of superconductivity through said composite conductor.

5. A cryotron translator adapted for simultaneous translation of a series of input characters into an output having a series of places, each of which may contain an output character, comprising the combination of a plurality of cryotron memory units, each corresponding to a place in the output, each of said memory units having a plurality of control stations for reading in the input characters determining the answer character in the place to which the memory unit corresponds, a control conductor at each station, each of said memory units having at least one gate conductor, all of said gate conductors being superconductive at the temperature of operation of said translator in the absence of an applied magnetic field and adapted to become resistive at such temperature upon the application of a magnetic field thereto, each gate conductor of a memory unit being magnetically coupled to each one of a combination of control conductors therein in such manner as to transfer between the superconductive and resistive states under the influence of a change in the magnetic field applied to it by the passage of a current through any of said control conductors in the combination coupled thereto, each of said gate conductors in each memory unit being coupled to a different combination of control conductors from every other gate conductor therein, whereby upon the passage of a current through all but one of the control conductors in each station the resistive state of no more than one gate conductor may remain unchanged, superconductive means connecting one end of each of said gate conductors in each memory to one end of every other gate conductor therein, and superconductive means connecting the other end of each of said gate conductors to the other end of every other gate conductor therein; and means for determining whether the conductive path comprising the parallel-connected gate conductors in each memory unit is superconductive, the gate conductors in each memory unit being coupled to the control conductors therein in such combinations that when a series of input characters is read into said translator in the form of currents through logical combinations of control conductors in each memory unit, the conductive state of said conductive path in each memory indicates the storage or nonstorage therein of said series of input characters and thereby also indicates the presence or absence of a character in the output place to which the memory corresponds.

6. The combination defined in claim 5 in which the corresponding control conductors of each of said memory units are connected in series so as to provide simultaneous interrogation of all of said memory units.

7. A cryotron translator adapted for simultaneous translation of a series of binary input digits into an output which is in binary form and has a series of places, each of which may have an output digit therein, said translator comprising the combination of a plurality of cryotron memory units, each of which corresponds to one place in said output, each of said memory units having at least one gate conductor and one control station, each of said control stations having a pair of control conductors, said gate conductors being superconductive at the temperature of operation of said translator in the absence of an applied magnetic field and adapted to become resistive at such temperature upon the application of magnetic fields thereto, each gate conductor in a memory unit being coupled to a combination of said control conductors therein in such manner as to transfer between the superconductive and resistive states under the influence of a change in the magnetic field applied to it by the passage of a current through any of the control conductors in the coupled combination thereof, each of the gate conductors in a memory unit being coupled to no more than one control conductor in each station and to a different combination of control conductors from every other gate conductor in that memory unit, each of said memory units having a gate conductor coupled to a combination of control conductors such that the memory unit remains superconductive only upon read-in of a combination of input digits providing a desired digit in the output place to which it corresponds, read-in of a combination of input digits being accomplished by passing currents through no more than one control conductor at each station in a combination corresponding to said series of binary input digits, superconductive means connecting one end of each gate conductor in each memory unit to one end of every other gate conductor therein, superconductive means connecting the other end of each gate conductor in each memory unit to the other end of every other gate conductor therein, whereby upon read-in of a series of input digits the conductive state of a memory unit determines the binary digit in the place in the output to which the memory unit corresponds.

8. The combination defined in claim 7 in which each memory unit has a gate conductor for each series of input digits providing a ONE in the place of the answer to which the memory unit corresponds, whereby upon read-in of a series of input digits to said translator each memory unit corresponding to a place in the answer having a One will change its conductive state.

9. A translator for simultaneously translating a series of input characters into a series of output characters in an output code, said translator comprising a plurality of cryotron memory units, each of said memory units corresponding to a predetermined place in said series of output characters and a predetermined character in that place; each of said memory units including a plurality of gate conductors which are superconductive at their temperature of operation in the absence of a quenching magnetic field and resistive in the presence of a quenching field, each of said gate conductors corresponding to a series of input characters, means for selectively applying quenching fields to said conductors according to the particular series of input characters to be translated, whereby when said field applying means is energized the presence or absence of a superconductive gate conductor in said memory unit indicates the presence of the character to which the memory unit corresponds in the place to which it corresponds and means for determining the presence or absence of a superconductive gate conductor in each of said memory units.

10. The combination defined in claim 9 in which one end of each gate conductor in a memory unit is superconductively connected to one end of every other gate conductor at one end of said memory unit and the other end of each gate conductor is superconductively connected to the other end of every other gate conductor at the other end of said memory unit, and means for determining the conductive state of the conductive path through each of said memory units between said ends thereof, said determining means including a source connected to pass a current through said memory from said one end to said other end thereof.

11. The combination defined in claim 10 including means responsive to the presence or absence of a voltage across said ends of each of said memory units when a current is passed through each of said units from one end thereof to the other end.

References Cited in the file of this patent

UNITED STATES PATENTS

| | | |
|---|---|---|
| 2,702,380 | Brustman | Feb. 15, 1955 |
| 2,739,301 | Greenfield | Mar. 20, 1956 |
| 2,744,955 | Canfora | May 8, 1956 |
| 2,808,984 | Marshall et al. | Oct. 8, 1957 |
| 2,832,897 | Buck | Apr. 29, 1958 |

UNITED STATES PATENT OFFICE

CERTIFICATE OF CORRECTION

Patent No. 3,019,978 February 6, 1962

Albert Ernest Slade et al.

It is hereby certified that error appears in the above numbered patent requiring correction and that the said Letters Patent should read as corrected below.

Column 2, line 39, for "translators" read -- translator is --.

Signed and sealed this 3rd day of July 1962.

(SEAL)
Attest:

ERNEST W. SWIDER
Attesting Officer

DAVID L. LADD
Commissioner of Patent